United States Patent [19]

Ozaki

[11] Patent Number: 5,415,288
[45] Date of Patent: May 16, 1995

[54] VIDEO CASSETTE CASE HAVING HARD PLASTIC SHEETS ON FLAT SURFACES THEREOF

[75] Inventor: Hiroshi Ozaki, Miyagi, Japan

[73] Assignee: Sony Corporation, Tokyo, Japan

[21] Appl. No.: 941,865

[22] Filed: Sep. 8, 1992

Related U.S. Application Data

[63] Continuation of Ser. No. 651,741, Feb. 6, 1991, abandoned.

[30] Foreign Application Priority Data

Feb. 8, 1990 [JP] Japan .............................. 2-011824 U

[51] Int. Cl.⁶ ................................................ B65D 85/672
[52] U.S. Cl. ............................ 206/387.1; 206/45.34; 220/455; 220/457
[58] Field of Search ................ 206/387, 524.2, 524.9, 206/45.34; 229/DIG. 4, 3.5 R; 428/34.2, 35.7; 220/454, 455, 457, 461

[56] References Cited

U.S. PATENT DOCUMENTS

| 2,233,207 | 2/1941 | Gillam | 206/45.34 |
|---|---|---|---|
| 3,445,052 | 5/1969 | Lewallen | 229/3.5 R X |
| 3,536,248 | 10/1970 | Odenhagen et al. | 229/3.5 R X |
| 4,445,612 | 5/1984 | Shepherd | 206/387 |
| 4,445,634 | 5/1984 | Sato | 206/387 X |
| 4,545,483 | 10/1985 | Shiba et al. | 206/387 |
| 4,635,797 | 1/1987 | Bankier | 206/472 |
| 4,700,840 | 10/1987 | Haddock | 206/449 |
| 4,717,021 | 1/1988 | Ditzig | 206/387 |
| 4,724,957 | 2/1988 | Burgschweiger | 206/387 X |
| 4,771,886 | 9/1988 | Johnson | 206/387 |
| 4,826,004 | 5/1989 | Dupuy | 206/45.31 X |

FOREIGN PATENT DOCUMENTS

| 0182721A3 | 5/1986 | European Pat. Off. | G11B 23/023 |
|---|---|---|---|
| 0220039A2 | 4/1987 | European Pat. Off. | G11B 7/09 |
| 0257703A2 | 3/1988 | European Pat. Off. | G11B 7/09 |
| 3313964A1 | 12/1983 | Germany | G11B 23/02 |
| 0350939A1 | 1/1990 | Germany | G11B 7/09 |
| 2079726 | 1/1982 | United Kingdom | B65D 5/50 |
| 2121007A | 12/1983 | United Kingdom | B65D 25/54 |
| 0000170 | 4/1979 | WIPO | 229/3.5 |

Primary Examiner—Paul T. Sewell
Assistant Examiner—Ted Kavanaugh
Attorney, Agent, or Firm—W. Patrick Bengtsson; Limbach & Limbach

[57] ABSTRACT

A cassette case for housing a tape cassette so that the tape cassette can be freely inserted thereinto and taken out therefrom is comprised of a reinforcing sheet harder than the video cassette case laminated on the outer surface of the video cassette case.

6 Claims, 6 Drawing Sheets

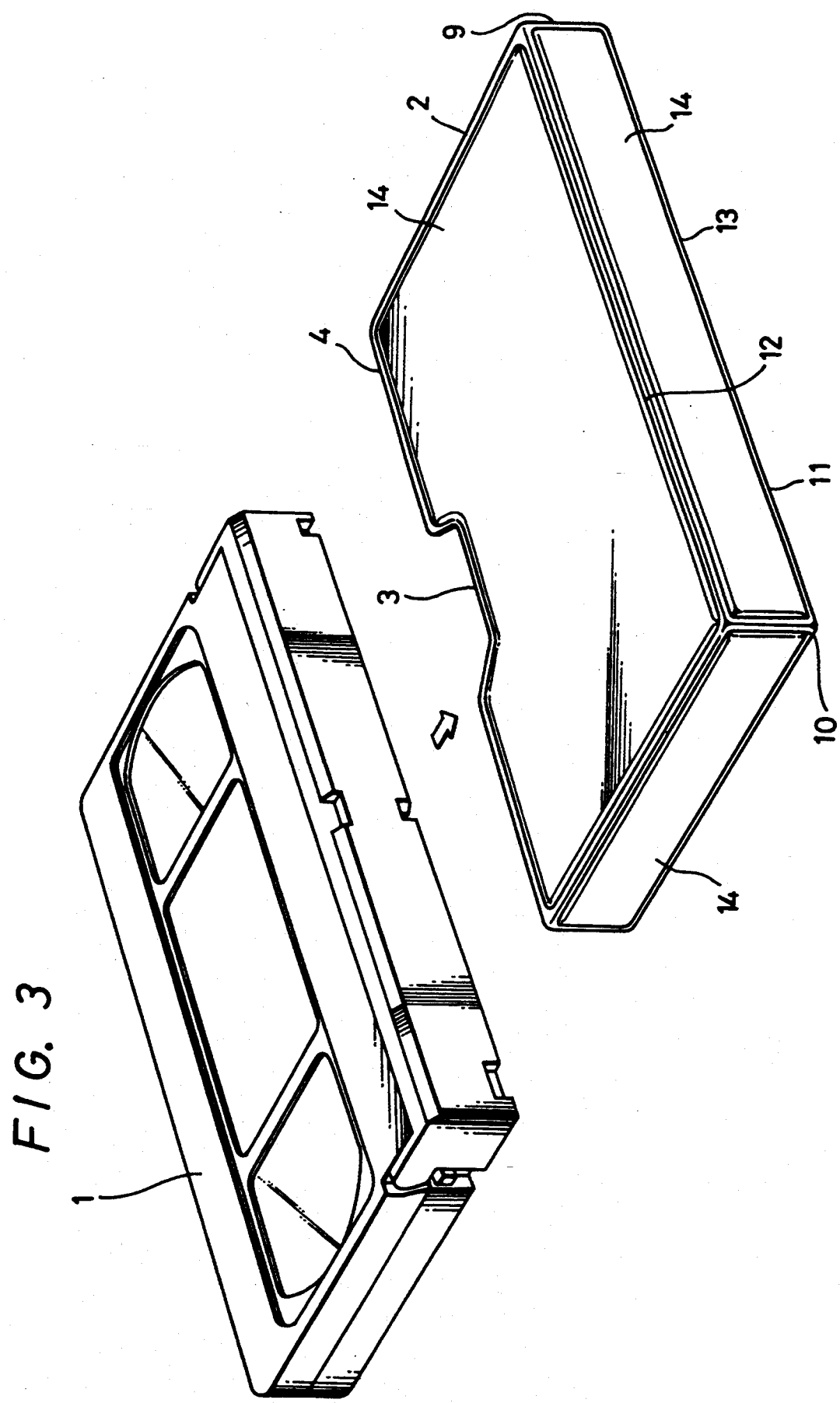

VIDEO CASSETTE CASE HAVING HARD PLASTIC SHEETS ON FLAT SURFACES THEREOF

This is a continuation of application Ser. No. 07/651,741, filed on Feb. 6, 1991, now abandoned.

BACKGROUND OF THE INVENTION

1. Field of the Invention

The present invention generally relates to cassette cases and, more particularly, is directed to a video cassette case having hard plastic sheets on flat surfaces thereof and in which a tape cassette or video cassette is housed.

2. Description of the Prior Art

As a cassette case for accommodating therein a tape cassette such as a video cassette or the like, a cassette case made of a paper board or polypropylene (hereinafter simply referred to as a PP) and so on has been frequently utilized hitherto. FIG. 1 shows a conventional video cassette case 2 for accommodating therein a video cassette. In this video cassette case 2 of substantially rectangular shape having a cassette inserting opening 4 formed on one side thereof and cassette withdrawing grooves 3 formed on left and right side walls thereof, a video tape cassette 1 which is not yet used, for example, is inserted from the cassette inserting opening 4 into the video cassette case 2 to be housed therein. Then, the video cassette case 2 is covered on its whole surface with a packaging film 5 and the video cassette case 2 is delivered from the factory. In FIG. 1, reference numeral 6 designates a peel tape which is used to peel the packaging film 5 from the whole surface of the video cassette case 2.

As explained in connection with FIG. 1, if a manufacturing cost of the video cassette case 2 made of paper board, PP and the like is reduced, then such video cassette case 2 will become thin and weak. For this reason, if gaps 7, 7, ... exist between the video cassette case 2 and the video tape cassette 1, then the video cassette case 2 will be wrinkled due to contraction of the packaging film 5 as shown in FIGS. 2A, 2B and 2C. In the video cassette case 2 shown in FIG. 2A, upper and lower side walls 9 and 10 are deformed in convex shapes 8a and 8b in the cassette insertion opening 4 due to the packaging film 5 and a distance $L_1$ between vertexes of these convex shapes 8a and 8b becomes shorter than a length L (see FIG. 1) of the longitudinal direction of the video tape cassette 1, which makes it difficult to insert the video tape cassette 1 into the video cassette case 2. Similarly, in the video cassette case 2 shown in FIG. 2B, the width of the cassette insertion opening 4 is increased at its central portion between the left and right side walls 11 and 12 and decreased at its upper and lower portions between the left and right side walls 11 and 12 so that a width A of the cassette insertion opening 4 at its central portion is increased as compared with a width A' of the insertion opening 4 at its upper and lower portions. Further, in the video cassette case 2 shown in FIG. 2C, the width A of the cassette insertion opening 4 at its central portion is reduced as compared with the width A' of the insertion opening 4 at its upper and lower portions. In either case, the sizes $L_1$, $L_2$ and $L_3$ in the longitudinal direction of the video cassette case 2 become smaller than the size L in the longitudinal direction of the video tape cassette 1. Also, the size A' of the insertion opening 4 at its upper and lower portions shown in FIG. 2B and the size A of the insertion opening 4 at its central portion shown in FIG. 2C become smaller than the lateral width of the video tape cassette 1. There is then the disadvantage that it becomes difficult to insert the video tape cassette 1 into the video cassette case 2 through the cassette insertion opening 4.

OBJECTS AND SUMMARY OF THE INVENTION

Accordingly, it is an object of the present invention to provide an improved video cassette case which can eliminate the aforenoted shortcomings and disadvantages encountered with the prior art.

More specifically, it is an object of the present invention to provide a video cassette case which can be protected from deformations such as distortion or the like in the vicinity of cassette insertion opening even when covered with a packaging film.

According to an aspect of the present invention, a video cassette case for housing a tape cassette so that the tape cassette can be freely inserted thereinto and taken out therefrom is comprised of reinforcing sheets harder than the video cassette case laminated on outer surface of the video cassette case.

The above, and other objects, features and advantages of the present invention will become apparent in the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 3 is a perspective view illustrating an embodiment of a video cassette case according to the present invention and a video tape cassette which is to be housed in the video cassette case.

DETAILED DESCRIPTION OF THE PREFERRED EMBODIMENT

An embodiment of the video cassette case according to the present invention will hereinafter be described in detail with reference to FIG. 3 and FIGS. 4A to 4C. In FIG. 3 and FIGS. 4A to 4C, like parts corresponding to those of FIG. 1 and FIGS. 2A to 2C are marked with the same references and therefore need not be described in detail.

FIG. 3 is a perspective view illustrating an overall arrangement of the embodiment of the video cassette case according to the present invention and a video tape cassette 1 to be housed in the video cassette case.

Referring to FIG. 3, there is provided the video cassette case 2 into and from which the video tape cassette 1 can be freely inserted and taken out, and this video cassette case 2 is made of paper board, soft plastic, white or transparent PP or the like. This video cassette case 2 is formed of upper, lower, left, right and rear walls 9, 10, 11, 12 and 13 to be a substantially rectangular shape so as to allow the video tape cassette 1 to be accommodated therein through its cassette insertion opening 4.

Figure 1:
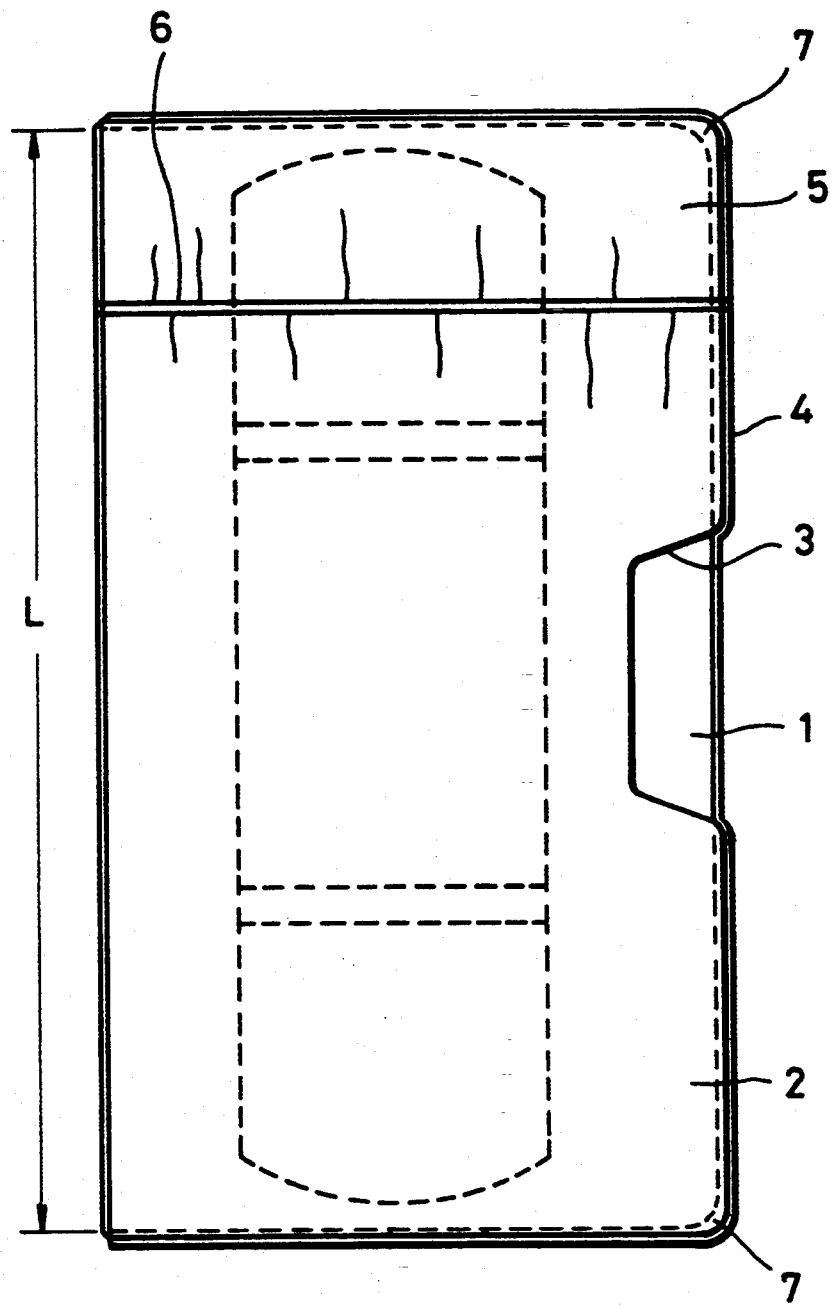
FIG. 1 is a plan view of a conventional video cassette case.
Figure 2A:
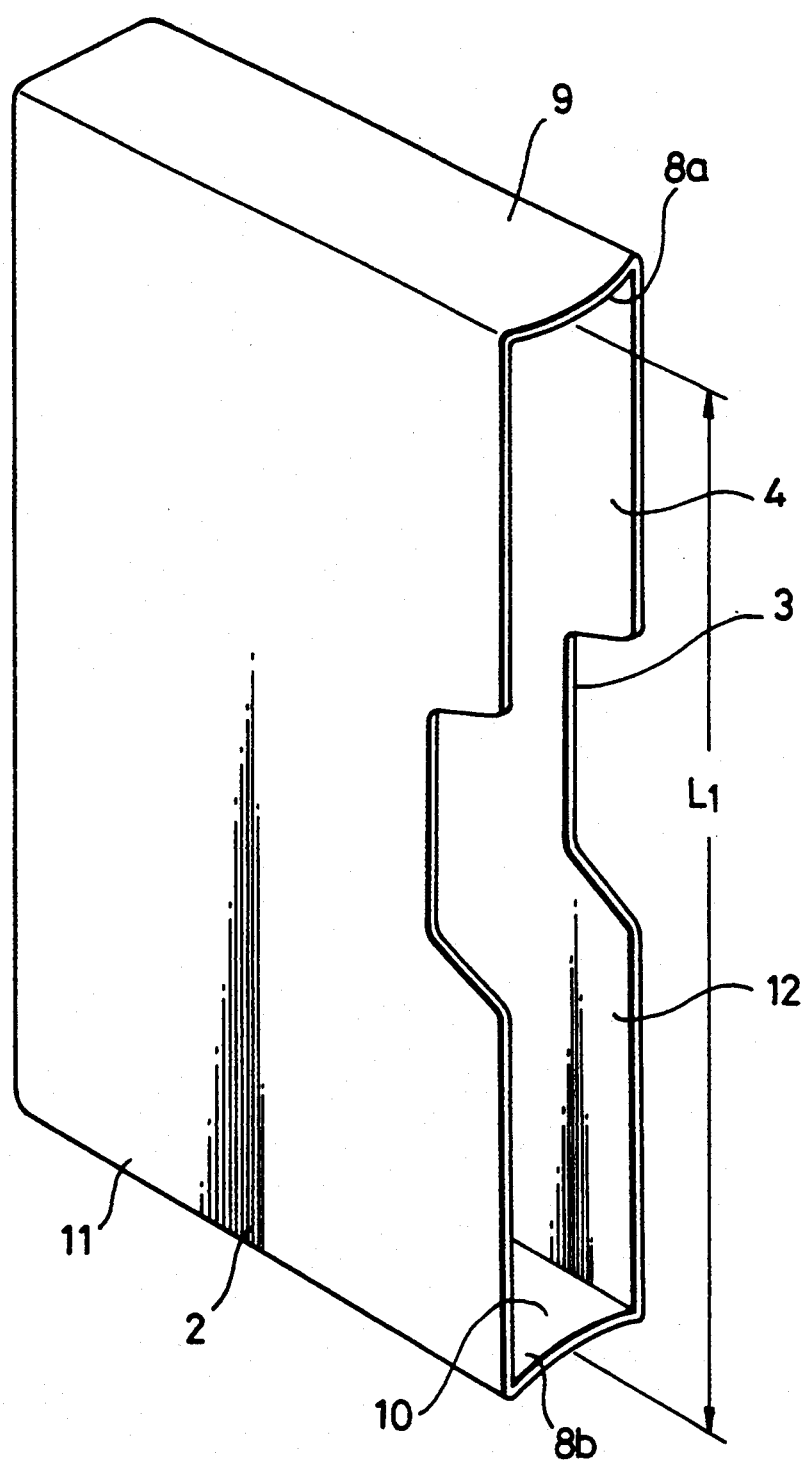
FIGS. 2A to 2C are perspective views, respectively, of a conventional video cassette case, and to which references will be made in explaining deformed states of the video cassette case.
Figure 2B:
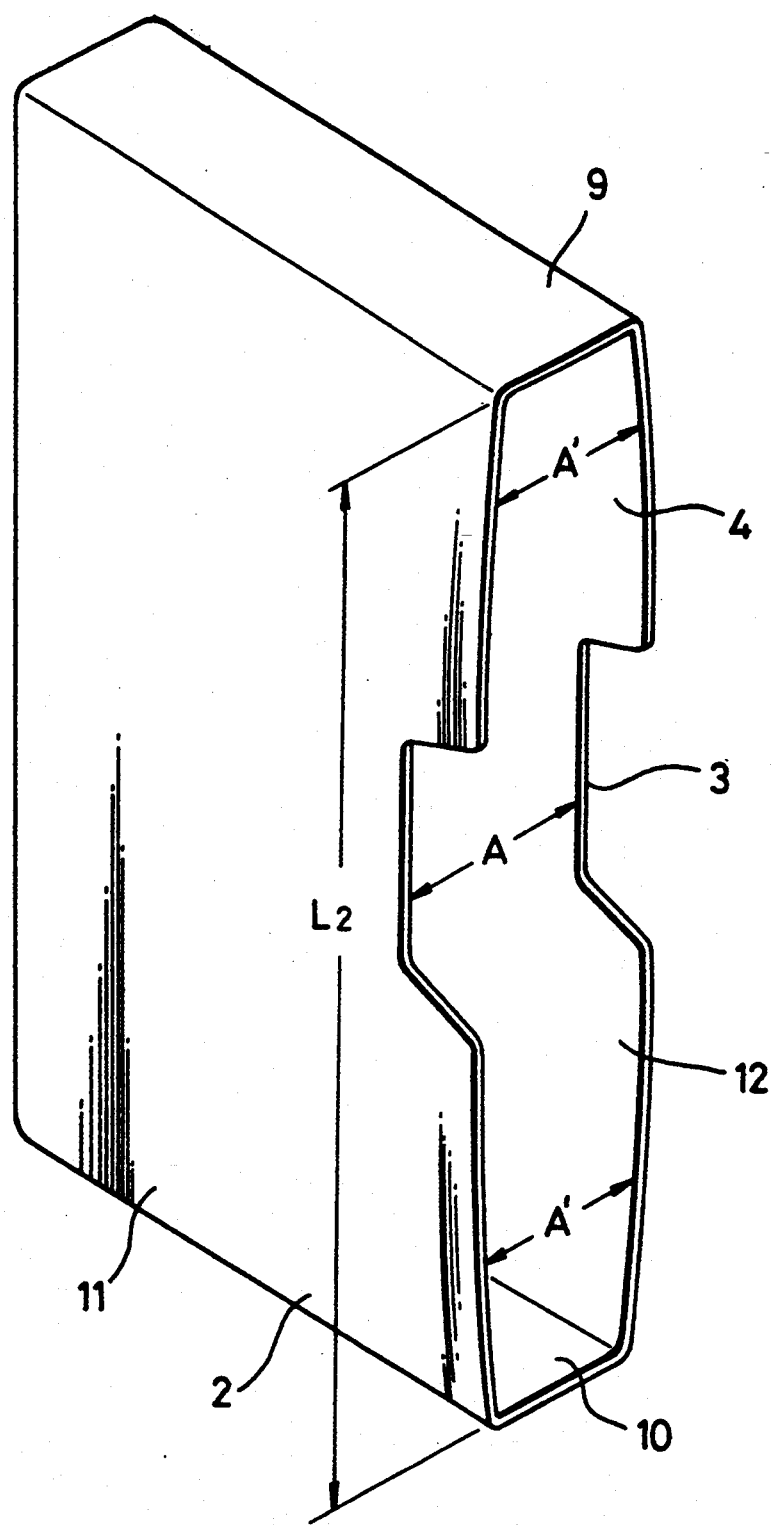
Figure 2C:
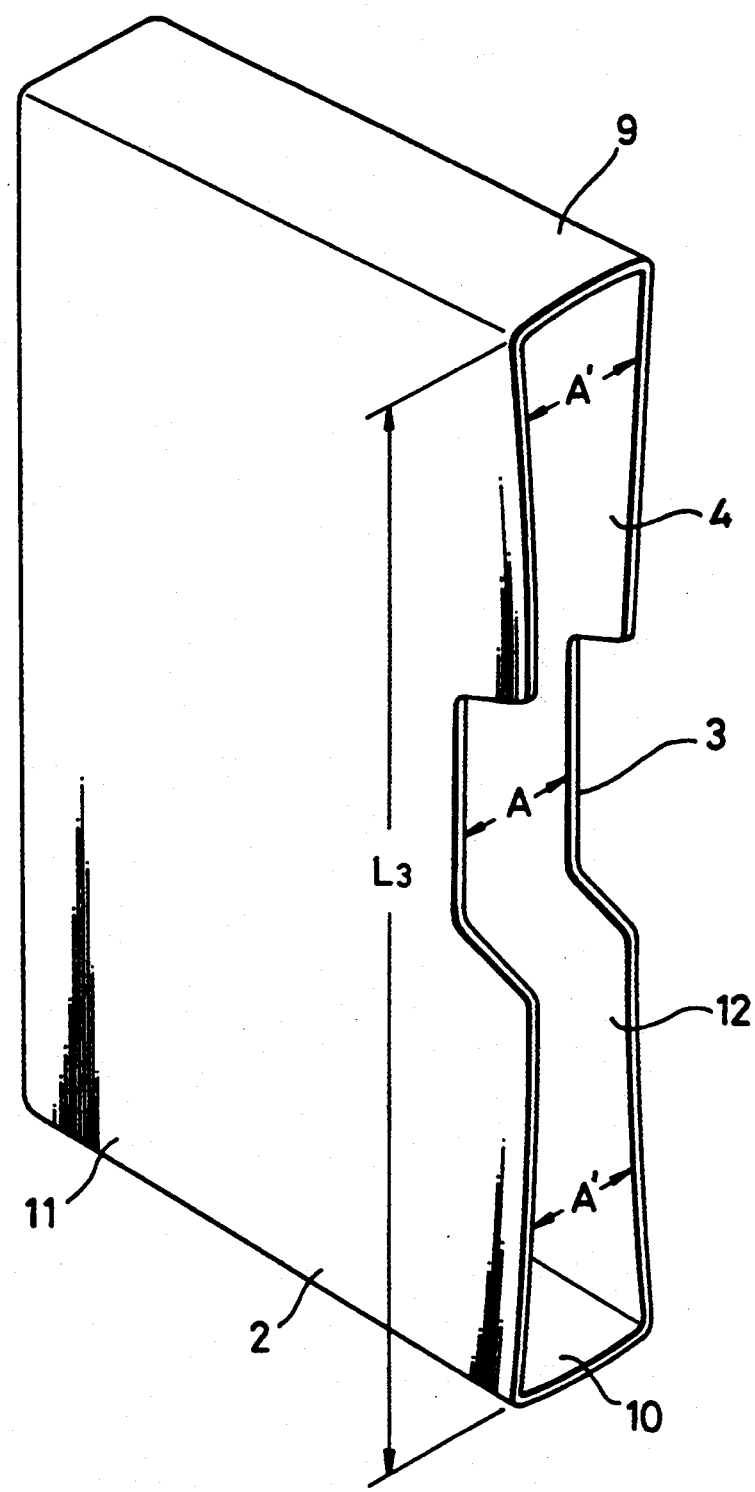
Figure 4B:
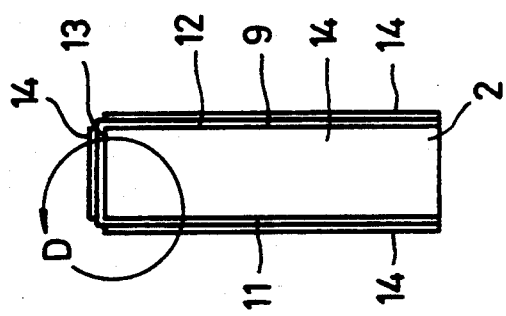
FIGS. 4A, 4B and 4C are schematic diagrams used to explain an assembly-process of the embodiment of the video cassette case according to the present invention, respectively.
Figure 4C:
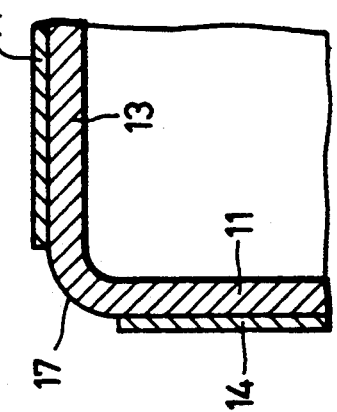
Figure 4A:
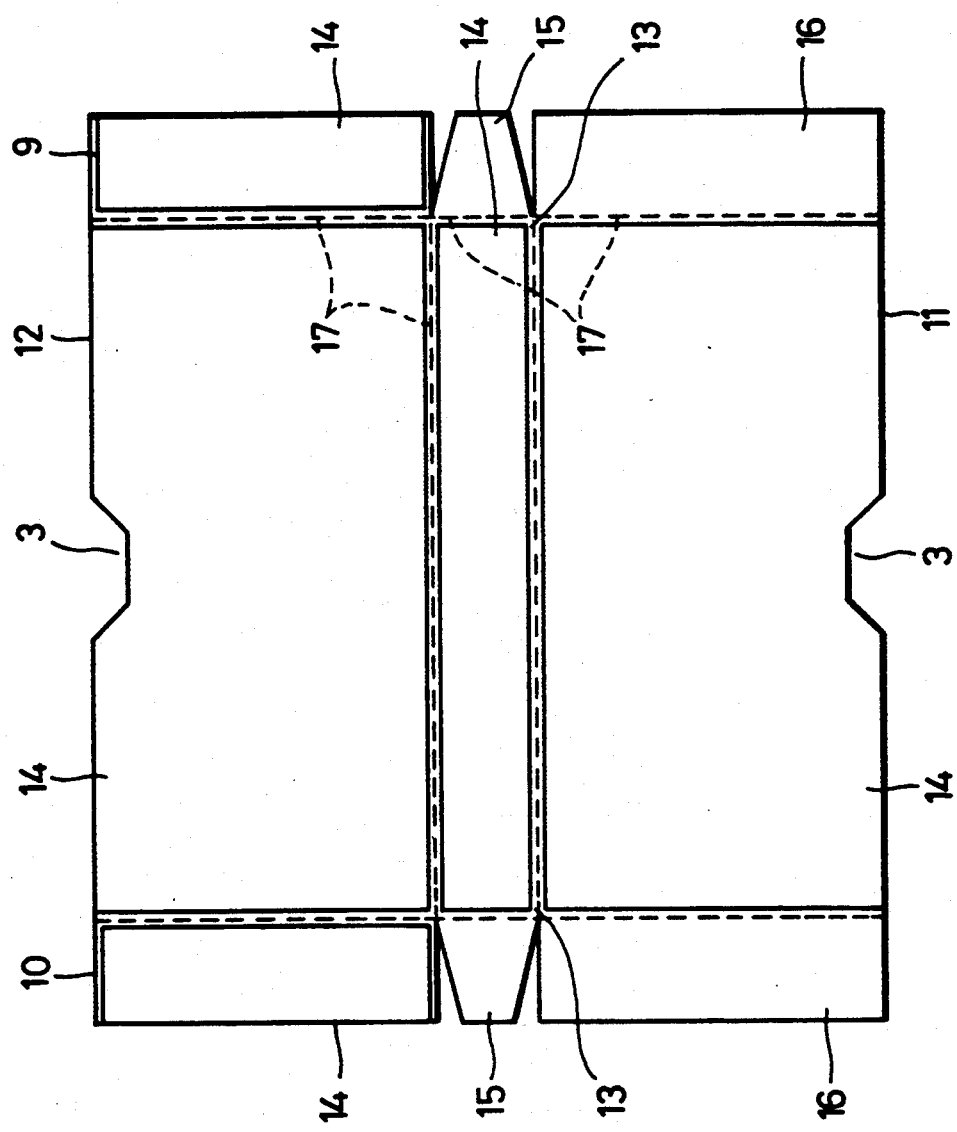

To this end, the paper board or the PP is cut out as, for example, shown by an expansion in FIG. 4A. As shown in FIG. 4A, margins 15, 15 are provided on left and right sides of the rear wall 13 in addition to the upper, lower, left, right and rear side walls 9, 10, 11, 12 and 13, and further, margins 16, 16 are formed, for example, on both sides of the left side wall 11. Then, reinforcing sheets 14, 14, ... are stuck to parts except for bending portions 17 shown by broken lines on the left and right side walls 11, 12, the rear side wall 13 and the upper and lower side walls 9, 10 to laminate the same on the outer side of the paper board or PP. When the video cassette case 2 is made of PP or the like, the reinforcing sheets 14, 14, ... may be made of a hard film-shaped polyvinyl chloride (PVC) or a PVC film containing about 5% of plasticizer.

Further, when the video cassette case 2 is made of the paper board or the like, the reinforcing sheets 14, 14, ... may be made of a soft film-shaped PVC containing about 30 to 50% of plasticizer. Alternatively, a synthetic resin such as polystyrene or the like may be coated or laminated. It is needless to say that these reinforcing sheets 14, 14, ... may be stuck on the upper, lower, left, right and rear side walls 9, 10, 11, 12 and 13 except for the margins 15, 15 and 16, 16 while the bending portions 17 may be cut out in a V-letter shape.

Further, some proper pattern or the like may be printed on the reinforcing sheets 14, 14, ... or some proper pattern or the like may be printed on the walls beneath reinforcing sheets and the reinforcing sheets 14, 14, ... are made transparent or the like, thereby obtaining a video cassette case having an outer appearance which has never been presented in the prior art. Further, if the reinforcing sheets 14, 14, ... are made transparent, then a print printed on the walls beneath them can be prevented from being peeled off.

Furthermore, if the base boards of the video cassette case 2 on which the reinforcing sheets 14, 14, ... are laminated are bent about the bending portions 17, 17 as shown in FIG. 4B and the upper and lower side walls 9, 10 are stuck or melted at the margins 15, 15, 16 and 16 by a paste or hot melt-process, it is possible to obtain the video cassette case 2. In that case, as shown in FIG. 4C which is an enlarged view of a portion D in FIG. 4B, each of the bending portions 17 is made of a relatively soft paper board or soft PP and has no reinforcing sheet 14 made of hard PVC or the like provided thereon so that the bending about each of the bending portions 17 can be carried out with ease.

According to the video cassette case of the present invention, it is possible to eliminate such disadvantage that the cassette insertion opening is deformed by the packaging film when the packaging film is contracted.

While the video cassette case is formed by bending the respective parts in the above-mentioned embodiment, the reinforcing sheet may be laminated on a video cassette case which is molded by a compression molding process, a blow molding process or the like.

According to the video cassette case of the present invention, even when the video cassette case is packaged by the packaging film after the video tape cassette is housed in the video cassette case, a cause in which a deformation occurs in the vicinity of the cassette insertion entrance of the video cassette case after the packaging film is opened can be removed, and the video cassette case can be prevented from being bent.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

I claim as my invention:

1. A video cassette case for housing a video tape cassette comprising a five-sided box formed in the shape of a rectangular solid, edges being formed where said sides are joined, where said case is made of polypropylene, and where each of said sides is laminated substantially over its entire surface, but not at said edges, with a reinforcing sheet of polyvinyl chloride harder than the polypropylene from which the video cassette case is made.

2. A video cassette case as in claim 1 wherein said reinforcing sheet is transparent.

3. A cassette case for housing a tape cassette comprising:

a polypropylene video cassette case having five sides, edges being formed where said sides are joined; and polyvinyl chloride reinforcing sheets harder than said video cassette case laminated on all outer surfaces of the video cassette, but not said edges.

4. A video cassette case according to claim 3, wherein said hard polyvinyl chloride contains about 5% of plasticizer.

5. A video cassette case for housing a video cassette having five sides forming a rectangular solid substantially the shape of a video tape cassette, edges being formed where said sides meet, wherein said case is formed from polypropylene and said case has thereon a reinforcing sheet of polyvinyl chloride layered over substantially its entire surface, and where said case is cut out in a v-letter shape along said edges.

6. A video cassette case as in claim 5 wherein said reinforcing sheet is transparent.

* * * * *